Patented Sept. 22, 1931

1,824,653

UNITED STATES PATENT OFFICE

ERNST BRAUCHLI, OF BASEL, SWITZERLAND, ASSIGNOR TO HOFFMANN-LA ROCHE INC., OF NUTLEY, NEW JERSEY, A CORPORATION OF NEW JERSEY

STABLE IRRADIATED ERGOSTERINE AND PROCESS FOR THE MANUFACTURE OF SAME

No Drawing. Application filed July 22, 1929, Serial No. 380,265, and in Germany September 22, 1928.

Irradiated ergosterine or irradiated solutions of ergosterine deteriorate in time, which fact manifests itself for instance by a diminution of the optic activity.

It has now been found, that by the addition of small quantities of phenols or phenol-like substances the deterioration of irradiated ergosterine or irradiated solution of ergosterine may be kept back. The phenols or phenol-like substances may be added either before or after irradiation of ergosterine or solutions of ergosterine.

Example

To 1000 parts by weight of a 0.5 per cent solution of ergosterine in benzol, which for an hour has been exposed to the rays of a mercury-vapor lamp, 0.15 parts by weight of hydroquinone are added. After a fortnight the optic activity, which had been determined immediately after irradiation, had but very slightly diminished, whereas a 0.5 per cent solution of ergosterine in benzol, to which no hydroquinone had been added and which had been irradiated at the same time, had become optically inactive after a week.

I claim:

1. A stable irradiated ergosterine preparation including a small quantity of a di-hydroxyl phenol as a stabilizing agent.

2. A stable irradiated ergosterine preparation including a small quantity of hydroquinone as a stabilizing agent.

In witness whereof I have hereunto set my hand.

ERNST BRAUCHLI.